United States Patent [19]

Spencer

[11] E Re. 29,499

[45] Reissued Dec. 20, 1977

[54] ON PREMISE TELEPHONE LOOP TESTER

[75] Inventor: Lucian W. Spencer, Arlington, Tex.

[73] Assignee: Reliance Telecommunication Electronics Company, Euless, Tex.

[21] Appl. No.: 584,065

[22] Filed: June 5, 1975

Related U.S. Patent Documents

Reissue of:

[64] Patent No.: 3,739,107
Issued: June 12, 1973
Appl. No.: 80,380
Filed: Oct. 13, 1970

[51] Int. Cl.[2] ..... H04B 3/46

[52] U.S. Cl. ..... 179/175.3 R; 179/2 A

[58] Field of Search ..... 179/175.3 R, 175.31 R, 179/2 A, 6 R; 324/95, 52

[56] References Cited

U.S. PATENT DOCUMENTS

| | | | |
|---|---|---|---|
| 1,350,737 | 8/1920 | Riess | 179/1 HS |
| 1,699,415 | 1/1929 | Wetzel | 179/175.3 R |
| 2,881,253 | 4/1959 | Marheine | 179/6 R |
| 3,067,289 | 12/1962 | Zimmermann | 179/6 R |
| 3,150,237 | 9/1964 | Baldik et al. | 179/81 |
| 3,308,239 | 3/1967 | Waldman et al. | 179/2 A |
| 3,371,165 | 2/1968 | Earle et al. | 179/175.3 R |
| 3,417,210 | 12/1968 | Chapin | 179/175.3 R |
| 3,485,952 | 12/1969 | Walker | 179/2 A |
| 3,496,300 | 2/1970 | Stokes | 179/175.3 R |
| 3,530,250 | 9/1970 | Schaum et al. | 179/2 A |
| 3,553,376 | 1/1971 | Bogaart | 179/2 A |
| 3,636,280 | 1/1972 | Wetzel | 179/175.3 R |
| 3,641,270 | 2/1972 | Ohshima et al. | 179/6 R |
| 3,663,769 | 5/1972 | Boatwright et al. | 179/175.3 R |
| 3,692,940 | 9/1972 | Konno et al. | 179/6 R |

*Primary Examiner*—Douglas W. Olms
*Attorney, Agent, or Firm*—Strauch, Nolan, Neale, Nies & Kurz

[57] ABSTRACT

The instant invention relates to a device that permits a telephone line (loop) to be tested from a telephone central office, thereby eliminating the expense resulting from a visit by a repairman to a subscriber's premises. The disclosed device is responsive to an audio tone of a predetermined frequency, is located on a subscriber's premises and is activated by an audio tone of frequency within the pass band of the telephone circuit, this tone being transmitted from a central office. A tuned detector, located within the device, upon receiving said predetermined tone, actuates a timing circuit and relay circuit that places a circuit across the tip and ring of a telephone line. The circuit simulates the electrical condition of a telephone instrument in the "off hook" position and causes central office line equipment to operate, if the telephone loop is in an operable state, thereby indicating that the telephone loop is complete from the central office to the subscriber's premises.

18 Claims, 2 Drawing Figures

LUCIAN W. SPENCER
INVENTOR

BY Roy B. Hart
ATTORNEY

ON PREMISE TELEPHONE LOOP TESTER

Matter enclosed in heavy brackets [ ] appears in the original patent but forms no part of this reissue specification; matter printed in italics indicates the additions made by reissue.

BACKGROUND OF THE INVENTION

There are many existing telephone loops that, due to their length, difficulty of access, or circuit makeup, are expensive to maintain. It is quite often the case, when a repairman visits a subscriber premises following a trouble report, that it is found that the telephone loope tests out satisfactorily and the compliant was caused by no one to answer the telephone, was due to a temporary equipment overload, or the telephone equipment, other than the loop itself, on the subscriber's premises was at fault. Thus, the repairman has made a trip to an extreme end of a telephone exchange for naught. In recent days, it is becoming more and more prevalent for subscribers to install and maintain their own on premise equipment, e.g., TWX, PBX, telephone equipment (hand sets) and the like. Thus, reports of "telephone" trouble by a subscriber to a telephone company are beginning to be mixed bag, i.e., troubles regarding equipment to the telephone company is responsible for (mainly the telephone loop) and troubles that the subscriber is responsible for (on premise equipment). The hereinafter disclosed invention allows telephone company personnel to make the distinction as to where the reported trouble is and whose responsibility it is, without a repairman leaving the maintenance depot.

SUMMARY OF THE INVENTION

The instant invention, a telephone loop tester, is a device that permits a telephone line to be tested (whether it is operable or not) from a telephone central office without the expense of a repairman's visit to a subscriber's premises. Such a device is especially valuable when a telephone loop consists of a carrier system because conventional capacitor charge tests techniques are inapplicable. Additionally, the telephone loop tester, as hereinafter disclosed, is also applicable to voice frequency circuits as well as circuits involving carrier.

When a subscriber reports trouble, telephone company personnel can transmit an audio tone of a frequency, within a telephone circuit pass band from a central office towards a subscriber's premises. This tone activates the invention (telephone loop tester), which is on the subscriber's premises. The on premise telephone loop tester contains a tuned detector, which upon receiving a tone, activates a timing circuit. This timing circuit, in turn, operates a relay circuit, which places a circuit across the plus and minus (tip and ring) sides of the telephone line. It is this circuit that simulates the electrical condition of a telephone instrument in the "off hook" position. This circuit is held for a predetermined length of time by a timer, and causes the central office line equipment to operate, thereby indicating to personnel in the central office that the telephone loop (circuit) is complete from the central office to the subscriber's premises and return.

Power of operation of the detector, timer and relay circuit is supplied by a nickel candium rechargeable battery, this battery being trickle charged from the telephone line, and generally located at the subscriber's premises. Alternatively, the detector, timer and relay circuit can be powered from commercial power available at the subscriber end or other means that are well known.

The most practical frequency to use for activating the detector in the on premise telephone loop tester is 1,000 hz., available in most telephone central offices as a milliwatt supply; however, any frequency within the pass band of the telephone circuit may be used. In fact, several units, each tuned to a different frequency, may be used on the same line, if ever required, such as a party line application or in cases where the invention is used for telemetering. In order to prevent actuation of the detector by voice energy, a diode switch is provided to disconnect the detector of the loop tester from the telephone circuit when the telephone circuit is in use.

BRIEF DESCRIPTION OF DRAWINGS

For the purpose of illustration of the instant invention, there is shown in the accompanying drawing, a circuit which makes up the on premise telephone loop tester. It is to be understood, however, that this drawing is for the purpose of example only and the invention is not limited thereto.

DESCRIPTION OF THE PREFERRED EMBODIMENT

Figure 2:
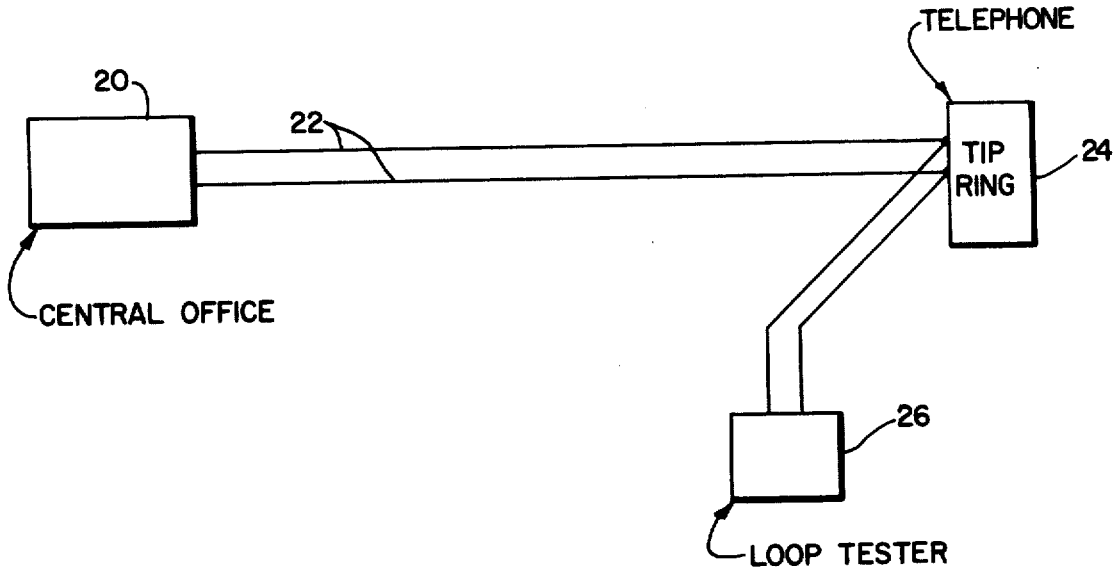
FIG. 2 is a schematic diagram of a telephone transmission system containing the telephone loop tester circuit shown in FIG. 1.

The on premise telephone loop tester is generally indicated at 26 in FIG. 2.

Figure 1:
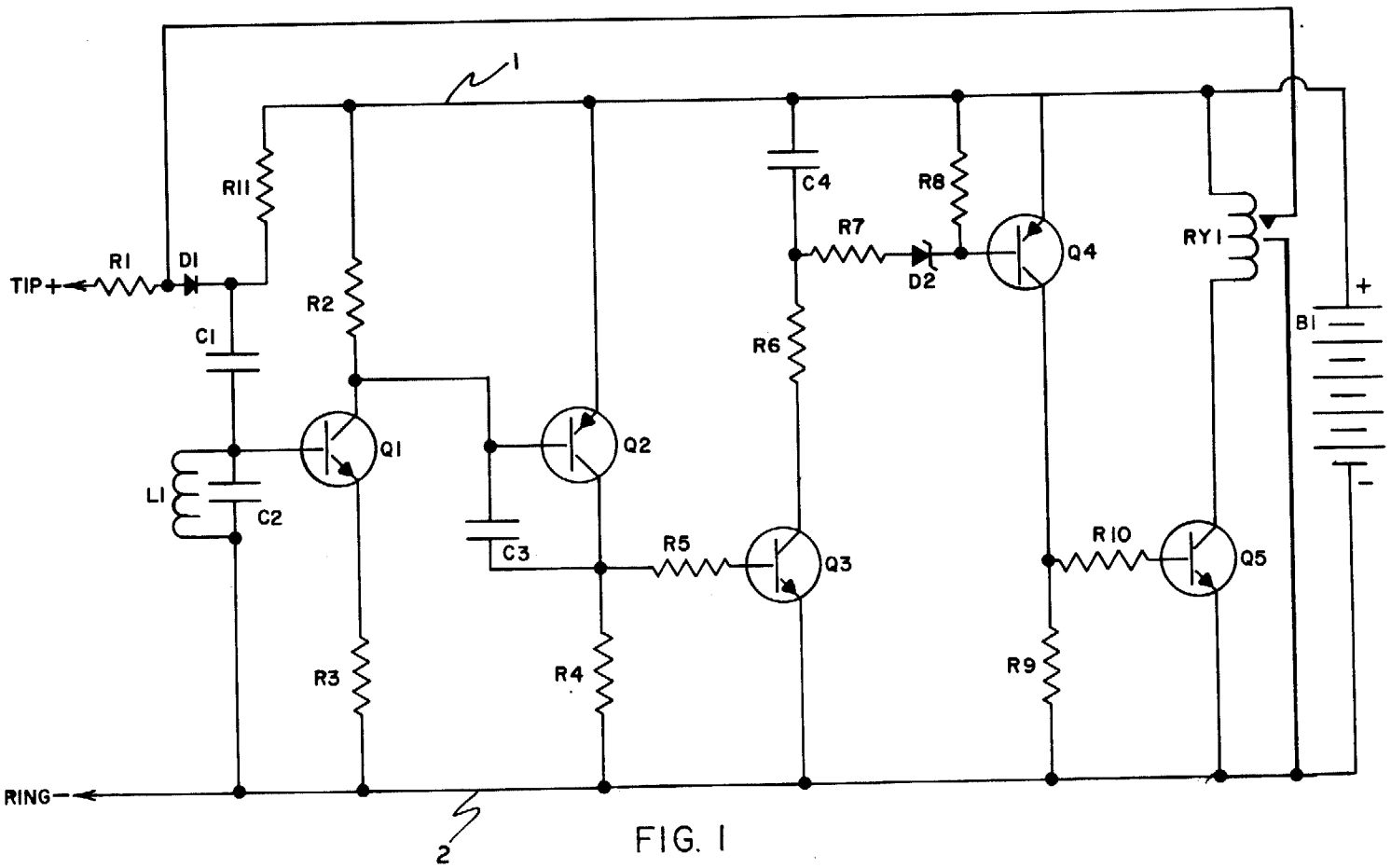
FIG. 1 is a schematic diagram of an on premise telephone loop tester circuit showing a detector, timer and relay circuit along with a power source rechargeable from the telephone line itself.

Making reference to FIG. 1, all transistors in the idle condition are cut off, i.e., not conducting; relay RY1 is released and the battery is being trickle charged by a current flowing in a path from the plus side of the telephone line 1 to the minus terminal side of the line. See elements 1 and 2 as well as the designations tip and ring in FIG. 1. Also see U.S. Pat. No. 3,510,584 for disclosure regarding trickle charging a battery from a telephone line, said disclosure herein incorporated by express reference.

Coil L1 and capacitor C2 are tuned to a predetermined frequency, for example 1,000 hz. Capacitor C1 is used to provide for A.C. coupling and D.C. blocking. Resistor R11 is selected in value to provide a proper amount of trickle charge to battery B1. Resistor R3 has a value so that transistor Q1 will present a high impedance to the tuned circuit (Coil 1 and C2).

When 1,000 hz, the previously mentioned tone, is transmitted from the central office 20 (See Fig. 2) over the telephone pair 22 (See FIG. 2) it is received at the plus minus terminals (tip and ring). This signal then flows through a path comprising resistor R1, diode D1, capacitor C1, the L1–C2 coil capacitor combination to the negative side of the line (ring). Since coil capacitor combination L1, C2 is tuned to this frequency, a voltage is developed across them, which, on positive peaks of the formentioned tone, will cause transistor Q1 to conduct. On each pulse, a collector of Q1 is made negative due to the voltage drop occurring across R2. This negative voltage is applied to the base of transistor Q2 causing it to become conductive. In this electrical state, capacitor C3 causes the base of transistor Q2 to remain negative between pulses and effectively acts as a filter. While transistor Q2 is conducting, its collector becomes positive and through resistor R5, causes transistor Q3 to conduct.

When transistor Q3 conducts, capacitor C4 is being charged, thereby supplying a voltage across current limiting resistor R6. This voltage is high enough to cause zener diode D2 to conduct, placing the base of transistor Q4 at a negative potential, thus causing transistor Q4 to conduct. The base of transistor Q4 remains negative for a length of time determined by the values of capacitor C4, resistor R7, diode D2 and resistor R8, such selection of values obviously being within the purview of one of only ordinary skill in the art. When transistor Q4 conducts, the collector becomes positive which, when applied to the base of transistor Q5 through resistor F10, causes transistor Q5 to conduct. This completes the path for the winding of relay RY1, thereby causing the contacts of RY1 to close.

When the contacts of relay RY1 close, resistor R1 is thereby placed across the ± (tip and ring) sides of the line causing a high current to flow over the talking pair. This high current flow causes an "off hook" signal to be sent towards the central office. This "off hook" signal remains a length of time determined by the time constants in the previously described circuitry. At the same instant that relay RY1 contacts close, D1 becomes back biased and therefore nonconducting. Consequently, the tone input is removed from the detector. After the tone is removed, each transistor, beginning with transistor Q1, returns to the nonconducting state. Q5 will remain in a conducting state for a period of time primarily determined by the RC time constant of C4–R7. Under normal conditions (non-testing) a telephone 24 (See FIG. 2), which is connected across the tip and ring (±) side of the telephone line defined by the telephone pair 22, is placed in the "off hook" condition, the voltage across tip and ring sides of the line drops to a point, below that of an unterminated loop condition, to where diode D1 is back biased and therefore nonconducting. Under this condition, the detector is disconnected from the line and cannot be operated by speech energy during a conversation. Of course, it is possible to replace relay RY1 with equivalents, such as a transistor. Furthermore, battery B1 can be replaced by a power source at, on or near that of the subscriber's premises.

The preceding disclosure has addressed itself to a situation where there is no open or short in the telephone loop. However, if there is an "open" with the telephone loop, the "off hook" signal is not received at the central office after the tone is transmitted therefrom because the "open" prevents the tone from completing its required electrical path. Obviously, if no tone is received at the on premise detector, it is not activated. When this situation exists, telephone company personnel know that trouble, whatever the nature or cause, is in the telephone loop and not in that equipment on the subscriber's premises. Other loop faults, i.e., "short," balance to ground, etc., are readily determined by existing telephone C0 testing routines. The invention described herein is ideally suited to determining those faults which degrade transmission without showing a definite DC fault, and more especially to carrier derived circuits to which routine DC testing techniques are not applicable. In the situation where a telephone company is responsible for both telephone loop and on premise equipment, the instant invention permits repairmen to eliminate either the loop or the equipment, thus permitting these repairmen to concentrate their efforts on that element of a telephone circuit that is causing trouble.

I claim:

1. A telephone loop tester comprising first and second conductors adapted to be electrically connected by a talking pair of conductors of a telephone transmisson line to a central office in a telephone transmission system that has a telephone set connected to said central office by said transmission line, and circuit means connected to said first and second conductors and responsive to the application of a predetermined, central office-transmitted signal to said first and second conductors for electrically simulating an off hook condition of said telephone set without disconnecting said telephone set from said central office by completing a current conducting path between said talking pair of conductors at a location that is remote from said central office[.], *said predetermined signal having a pre-selected frequency, and means for rendering said circuit means non-responsive to signals having said pre-selected frequency in response to the transfer of said telephone set to its off hook state.*

[2. The telephone loop tester defined in claim 1 wherein said predetermined signal has a pre-selected frequency and wherein means are provided for rendering said circuit means non-responsive to signals having said pre-selected frequency in response to the transfer of said telephone set to its off hook state.]

3. A telephone loop tester comprising *tuned* detecting means adapted to be connected to a central office by a talking pair of conductors of a telephone transmission line in a telephone system that has a telephone set connected to said central office by said transmission line, said detecting means being operative to detect a signal of pre-selected frequency that is transmitted by said talking pair of conductors from said central office [and] means responsive to the detection of said signal of pre-selected frequency by said detecting means for electrically simulating an off hook condition of said telephone set remotely from said central office to provide an off hook signal while said telephone set is in its on hook state and without disconnecting said telephone set from said central office[.], *said means for simulating said off hook condition of said telephone set comprising a circuit rendered effective by said detecting means upon detecting said signal of pre-selected frequency for completing a current-conducting circuit path that bridges said conductors in parallel relation with said telephone set and means rendered effective by the completion of said current-conducting circuit path for preventing application of a detectable signal to said detecting means while said current-conducting circuit path is completed.*

[4. The telephone loop tester defined in claim 3 wherein said means for simulating said off hook condition of said telephone set comprises a circuit rendered effective by said detecting means upon detecting said signal of pre-selected frequency for completing a current-conducting circuit path that bridges said conductors in parallel relation with said telephone set.]

[5. The telephone loop tester defined in claim 4 comprising means rendered effective by the completion of said current-conducting circuit path for preventing application of a detectable signal to said detecting means while said current-conducting circuit path is completed.]

[6. The telephone loop tester defined in claim 4 comprising a unidirectional current-conducting device connected to said detecting means for blocking application of detectable signals to said detecting means whenever said telephone set is in its off hook state.]

7. The telephone loop tester defined in claim [6] *31* wherein said unidirectional current-conducting device and said detecting means are connected in series, and wherein said means for completing said current-conducting circuit path comprises switch means in parallel with said detecting means and said device.

8. The telephone loop tester defined in claim [4] *3* wherein said circuit rendered effective by said detecting means comprises means for disabling said [circuit] *current* path after a pre-selected time delay.

[9. In a telephone transmission system having a subscriber's telephone set and a talking pair of conductors connecting said telephone set to a central office, the improvement comprising means connected to said conductors remotely from said central office and responsive to a central office-transmitted signal of pre-selected frequency for electrically simulating an off hook condition of said telephone set by causing an off hook signal to be sent back to said central office as if said telephone set were actually transferred to its off hook state and without disconnecting said telephone set from said central office.]

[10. In a telephone transmission system, a subscriber's telephone instrument, a two conductor transmission line connecting said telephone instrument to a central office, and a telephone loop testing circuit electrically connected to the conductors of said transmission line remotely from said central office and comprising means for detecting a central office-transmitted signal of pre-selected frequency when said telephone instrument is in its on hook state, and means responsive to the detection of said signal of pre-selected frequency by said detecting means for completing a circuit between said conductors in parallel with said telephone instrument while said telephone instrument is in its on hook state and without disconnecting said telephone instrument from said central office to provide an off hook signal as if said telephone instrument were actually transferred to its off hook state.]

[11. A telephone loop tester for a telephone transmission system that has a subscriber's telephone instrument connected by a two-conductor transmission line to central office equipment at a central office, said telephone loop tester comprising first and second conductors adapted to be connected to the conductors of said transmission line remotely from said central office and circuit means connected to aid first and second conductors and responsive to a pre-selected central office-transmitted signal for simulating an off hook condition of said telephone instrument to provide an off hook signal that is capable of operating said central office equipment as if said telephone instrument were actually transferred to its off hook state without disconnecting said telephone instrument from said central office and while said telephone instrument is in its on hook state, the failure of said central office equipment to operate upon transmittal of said pre-selected signal providing an indication that a fault or trouble may exist in said line.]

[12. In a telephone transmission system having a subscriber's telephone instrument and a talking pair of conductors connecting said telephone instrument to central office line equipment at a central office, the improvement comprising a circuit connected to said conductors remotely from said central office and responsive to a central office-transmitted signal of pre-selected frequency for simulating an off hook condition of said telephone instrument to provide an off hook signal that is capable of operating said central office equipment as if said telephone instrument were actually transferred to its off hook state without disconnecting said telephone instrument from said central office and while said telephone instrument is in its on hook state.]

13. In a telephone transmission system, a subscriber's telephone instrument and a talking pair of conductors for connecting said telephone instrument to a central office, said conductors being adapted to be connected to central office-located equipment that is capable of being operated by the off hook signal that is produced by transference of said telephone instrument to its off hook state, and a telephone loop tester connected to said conductors remotely from said central office and comprising means for detecting a central office-transmitted signal of pre-selected frequency and a circuit responsive to the detection of said central office-transmitted signal by said detecting means for completing a current-conducting circuit path that bridges said conductors in parallel with said telephone instrument to provide an off hook signal that is capable of operating said equipment as if said telephone instrument were actually transferred to its off hook state without disconnecting said telephone instrument from said central office and while said telephone instrument is in its on hook state[.], *said telephone loop tester further comprising means in series circuit relationship with said detecting means and rendered effective by the transfer of said telephone instrument to its off hook state to block application of detectable signals to said detecting means and thereby prevent the detection of a central office-transmitted signal of said pre-selected frequency whenever said telephone instrument is in its off hook state.*

[14. The telephone transmission system defined in claim 13 wherein said telephone loop tester further comprises means in series circuit relationship with said detecting means and rendered effective by the transfer of said telephone instrument to its off hook state to block application of detectable signals to said detecting means and thereby prevent the detection of a central office-transmitted signal of said pre-selected frequency whenever said telephone instrument is in its off hook state.]

15. In a telephone transmission system, a telephone instrument and a talking pair of conductors for connecting said telephone instrument to a central office, said conductors being adapted to be connected to central office-located equipment that is capable of being operated by transference of said telephone instrument to its off hook state, and a telephone loop testing circuit connected to said conductors remotely from said central office and comprising means for detecting a central office-transmitted signal of pre-selected frequency, switch means connected between said conductors in parallel with said telephone instrument, said switch means being capable of being conditioned to complete a current conducting path that bridges said conductors in parallel with said telephone instrument, means rendered effective by said detecting means upon the detection of said central office-transmitted signal for [conditioning] *conducting* said switch means to complete said current conducting path, said current conditioning path being effective upon being completed to cause operation of said equipment as if said telephone instrument were transferred to its off hook state and without disconnecting said telephone instrument from said central office[.], *said switch means being connected in parallel circuit relationship with said detecting means, and said loop testing circuit further comprising a unidirectional current-conducting device in series with said detecting means for blocking the application of detectable signals to said detecting means whenever said telephone instrument is in its off hook state to thereby prevent the detection of a signal of said pre-selected frequency whenever said telephone instrument is in its off hook state.*

[16. The telephone transmission system defined in claim 15 wherein said switch means is connected in parallel circuit relationship with said detecting means.]

[17. The telephone transmission system defined in claim 16 wherein said loop testing circuit comprises a unidirectional current conducting device in series with said detecting means for blocking the application of detectable signals to said detecting means whenever said telephone instrument is in its off hook state to thereby prevent the detection of a signal of said pre-selected frequency whenever said telephone instrument is in its off hook state.]

[18. The telephone transmission system defined in claim 15 wherein said means for conditioning said switch means to complete said current conducting path includes time delay means rendered effective by the detection of said signal of pre-selected frequency for conditioning said switch means to disable said current conducting path upon expiration of a pre-selected time following the detection of said signal of pre-selected frequency by said detecting means.]

[19. The telephone transmission system defined in claim 18 wherein said loop testing circuit further comprises means for blocking application of a detectable signal to said detecting means while said current conducting path is completed.]

[20. A telephone loop tester comprising detecting means adapted to be connected to a central office by a talking pair of conductors of a telephone transmission line in a telephone transmission system that has a telephone instrument connected to said central office by said transmission line, said detecting means being effective to detect a central office-transmitted signal of pre-selected frequency, and circuit means responsive to the detection of said signal by said detecting means for completing a current-conducting circuit path that bridges said talking pair of conductors in parallel with said telephone instrument and remotely from said central office to provide an off hook signal as if said telephone instrument were actually transferred to its off hook state without disconnecting said telephone instrument from said central office and while said telephone instrument is in its on hook state.]

*21. A telephone loop tester adapted to be electrically connected to a transmission medium in a telephone system in which said transmission medium provides a two way transmission path between a subscriber's telephone and a central office and includes tip and ring conductors connected to said telephone set, said telephone loop tester comprising a signal detecting circuit for detecting a pre-selected central office-originated signal which is fed to the detector circuit from said transmission medium, means responsive to the detection of said pre-selected signal by said detecting circuit for completing a current shunt across said ring and tip conductors without disconnecting said telephone set from said central office and without transferring said telephone set to its off hook condition, said shunt upon being completed beng effective to cause a change in an electrical condition which is detectable at said central office if said transmission medium is operable, and a unidirectional current-conducting device electrically connected to said detecting circuit for blocking application of detectable signals to said detecting circuit whenever said telephone set is in its off hook state.*

*22. A telephone loop tester adapted to be electrically connected to a talking pair of conductors in a telephone system in which the talking pair of conductors is connected to a subscriber's telephone equipment and forms at least a part of a transmission facility that connects said telephone equipment to a central office, said telephone loop tester comprising a tuned detector for sensing a central office-originated test signal of pre-selected frequency which is transmitted by said transmission facility to said tuned detector, means responsive to the sensing of said test signal by said tuned detector for completing a current-conducting path across the conductors of said talking pair without transferring said telephone equipment to its off hook condition, said current-conducting path upon being completed being effective to cause a change in an electrical condition that is detectable at said central office to provide an indication that said transmission facility is operative apart from the subscriber's telephone equipment, and means rendered effective by the completion of said current-conducting path for preventing application of a detectable test signal to said detector while said path is completed.*

*23. A telephone loop tester adapted to be electrically connected to a talking pair of conductors in a telephone system in which the talking pair of conductors is connected to a subscriber's telephone equipment and forms at least a part of a transmission facility that connects said telephone equipment to a central office, said telephone loop tester comprising a tuned detector for sensing a central office-originated test signal of pre-selected frequency which is transmitted by said transmission facility to said tuned detector, means responsive to the sensing of said test signal by said tuned detector for completing a current-conducting path across the conductors of said talking pair without transferring said telephone equipment to its off hook condition, said current-conducting path upon being completed being effective to cause a change in an electrical condition that is detectable at said central office to provide an indication that said transmission facility is operative apart from the subscriber's telephone equipment, and a unidirectional current-conducting device electrically connected to said detector for blocking application of detectable test signals to said detector whenever said telephone equipment is in its off hook state.*

*24. The telephone loop tester defined in claim 23, wherein said unidirectional current-conducting device and said detector are electrically connected in series, and wherein said means for completing said current-conducting path comprises switch means in parallel with said detector and said device.*

*25. A telephone loop tester adapted to be electrically connected to a talking pair of conductors in a telephone system in which the talking pair of conductors is connected to a subscriber's telephone equipment and forms at least a part of a transmission facility that connects said telephone equipment to a central office, said telephone loop tester comprising a tuned detector for sensing a central office-originated test signal of pre-selected frequency which is transmitted by said transmission facility to said tuned detector, means responsive to the sensing of said test signal by said tuned detector for completing a current-conducting path across the conductors of said talking pair without*

*transferring said telephone equipment to its off hook condition, said current-conducting path upon being completed being effective to cause a change in an electrical condition that is detectable at said central office to provide an indication that said transmission facility is operative apart from the subscriber's telephone equipment, and means rendered effective by the transfer of said telephone equipment to the off hook state to block application of the test signal to said detector.*

*26. A telephone loop tester adapted to be electrically connected to a talking pair of conductors in a telephone system in which the talking pair of conductors is connected to a subscriber's telephone equipment and forms at least a part of a transmission facility that connects said telephone equipment to a central office, said telephone loop tester comprising a tuned detector for sensing a central office-originated test signal of pre-selected frequency which is transmitted by said transmission facility to said tuned detector, means responsive to the sensing of said test signal by said tuned detector for completing a current-conducting path across the conductors of said talking pair without transferring said telephone equipment to its off hook condition, said current-conducting path upon being completed being effective to cause a change in an electrical condition that is detectable at said central office to provide an indication that said transmission facility is operative apart from the subscriber's telephone equipment, and means rendered effective by the transfer of said telephone equipment to the off hook state for preventing the completion of said current-conducting path by the transmission of said test signal as long as said telephone equipment is in the off hook state.*

*27. The telephone loop tester defined in claim 26, comprising a time delay circuit responsive to the detection of said test signal by said detector for maintaining said current-conducting path completed for a pre-selected time interval following termination of the detected test signal.*

*28. A telephone loop tester adapted to be electrically connected to a talking pair of conductors in a telephone system in which the talking pair of conductors is connected to a subscriber's telephone equipment and forms at least a part of a transmission facility that connects said telephone equipment to a central office, said telephone loop tester comprising a frequency-discriminating, tuned detector for sensing a test signal of pre-selected frequency which is transmitted by way of said facility to said detector, means responsive to the sensing of said test signal by said detector for completing a circuit across the conductors of said talking pair to cause a change in a predetermined electrical condition that is detectable at the central office to provide an indication that said facility is operative apart from said telephone equipment, and means rendered effective by the transfer of said telephone equipment to the off hook state for preventing the completion of said circuit upon the transmittal of said test signal as long as said telephone equipment is in the off hook state.*

*29. The telephone loop tester defined in claim 28 wherein said detector is a resonant circuit.*

*30. The telephone loop tester defined in claim 28 comprising a time delay circuit responsive to the sensing of said test signal by said detector for maintaining said current-conducting path completed for a pre-selected time interval following termination of the sensed test signal.*

*31. A telephone loop tester comprising tuned detecting means adapted to be connected to a central office by a talking pair of conductors of a telephone transmission line in a telephone system that has a telephone set connected to said central office by said transmission line, said detecting means being operative to detect a signal of pre-selected frequency that is transmitted by said talking pair of conductors from said central office, means responsive to the detection of said signal of pre-selected frequency by said detecting means for electrically simulating an off hook condition of said telephone set remotely from said central office to provide an off hook signal while said telephone set is in its on hook state and without disconnecting said telephone set from said central office, said means for simulating said off hook condition of said telephone set comprising a circuit rendered effective by said detecting means upon detecting said signal of pre-selected frequency for completing a current-conducting circuit path that bridges said conductors in parallel relation with said telephone set, and a unidirectional current-conducting device connected to said detecting means for blocking application of detectable signals to said detecting means whenever said telephone set is in its off hook state.*

*32. In a telephone transmission system, a telephone instrument and a talking pair of conductors for connecting said telephone instrument to a central office, said conductors being adapted to be connected to central office-located equipment that is capable of being operated by transference of said telephone instrument to its off hook state, and a telephone loop testing circuit connected to said conductors remotely from said central office and comprising means for detecting a central office-transmitted signal of pre-selected frequency, switch means connected between said conductors in parallel with said telephone instrument, said switch means being capable of being conditioned to complete a current conducting path that bridges said conductors in parallel with said telephone instrument, means rendered effective by said detecting means upon the detection of said central office-transmitted signal for conditioning said switch means to complete said current conducting path, said current conducting path being effective upon being completed to cause operation of said equipment as if said telephone instrument were transferred to its off hook state and without disconnecting said telephone instrument from said central office, said means for conditioning said switch means to complete said current conducting path including time delay means rendered effective by the detection of said signal of pre-selected frequency for conditioning said switch means to disable said current-conducting path upon expiration of a pre-selected time following the detection of said signal of pre-selected frequency by said detecting means, and said loop testing circuit further comprising means for blocking application of a detectable signal to said detecting means while said current-conducting path is completed.*

* * * * *

UNITED STATES PATENT AND TRADEMARK OFFICE

CERTIFICATE OF CORRECTION

PATENT NO. : Re. 29,499

DATED : December 20, 1977

INVENTOR(S) : Lucian W. Spencer

It is certified that error appears in the above-identified patent and that said Letters Patent are hereby corrected as shown below:

Column 1, line 16 change "loope" to --loop--.

Column 1, line 17 change "compliant" to --complaint--.

Rewrite lines 64-66 of Column 6, Claim 15 as follows: --said central office-transmitted signal for conditioning said switch means to complete said current conducting path, said current [conditioning] conducting path--.

Signed and Sealed this

*Nineteenth* Day of *February 1980*

[SEAL]

*Attest:*

SIDNEY A. DIAMOND

*Attesting Officer*

*Commissioner of Patents and Trademarks*